(12) United States Patent
Erny et al.

(10) Patent No.: US 8,011,481 B2
(45) Date of Patent: *Sep. 6, 2011

(54) METHOD FOR MONITORING OPERATING STATES OF AN ELEVATOR UNIT BY SENSING MOVABLE BRAKE PART

(75) Inventors: Karl Erny, Holzhäusem (CH); Urs Lindegger, Ebikon (CH); Rudolf Eckenstein, Baar (CH)

(73) Assignee: Inventio AG, Hergiswil NW (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/892,041

(22) Filed: Sep. 28, 2010

(65) Prior Publication Data

US 2011/0011682 A1 Jan. 20, 2011

Related U.S. Application Data

(60) Division of application No. 12/624,681, filed on Nov. 24, 2009, now Pat. No. 7,909,145, which is a continuation of application No. PCT/EP2008/055303, filed on Apr. 30, 2008.

(30) Foreign Application Priority Data

Jun. 18, 2007 (EP) .................................... 07110428

(51) Int. Cl.
*B66B 1/34* (2006.01)

(52) U.S. Cl. ................................... 187/393; 188/1.11 E
(58) Field of Classification Search .................. 187/277, 187/287, 288, 351, 356, 367, 391–393; 188/1.11 E
See application file for complete search history.

(56) References Cited

U.S. PATENT DOCUMENTS

| 4,984,659 | A | 1/1991 | Nomura |
| 5,255,760 | A | 10/1993 | Lamb et al. |
| 7,398,863 | B2 | 7/2008 | Liebetrau et al. |
| 2008/0128218 | A1 | 6/2008 | Gremaud et al. |
| 2008/0308360 | A1 | 12/2008 | Weinberger et al. |
| 2010/0154527 | A1* | 6/2010 | Illan ............................ 73/121 |
| 2010/0252368 | A1* | 10/2010 | Fischer ........................ 187/247 |

FOREIGN PATENT DOCUMENTS

JP 05193858 A 8/1993

* cited by examiner

*Primary Examiner* — Jonathan Salata
(74) *Attorney, Agent, or Firm* — Ladas & Parry LLP

(57) ABSTRACT

A method for monitoring the operating state of an elevator drive having a brake includes the mounting of a sensor on a movable brake part. The sensor generates an output proportional to the extent of relative movement between the brake part upon which it is mounted and a fixed brake part. The sensor output is monitored to provide an indication of the operating state of the drive and may be combined with other data to provide indications of a variety of drive states.

7 Claims, 7 Drawing Sheets

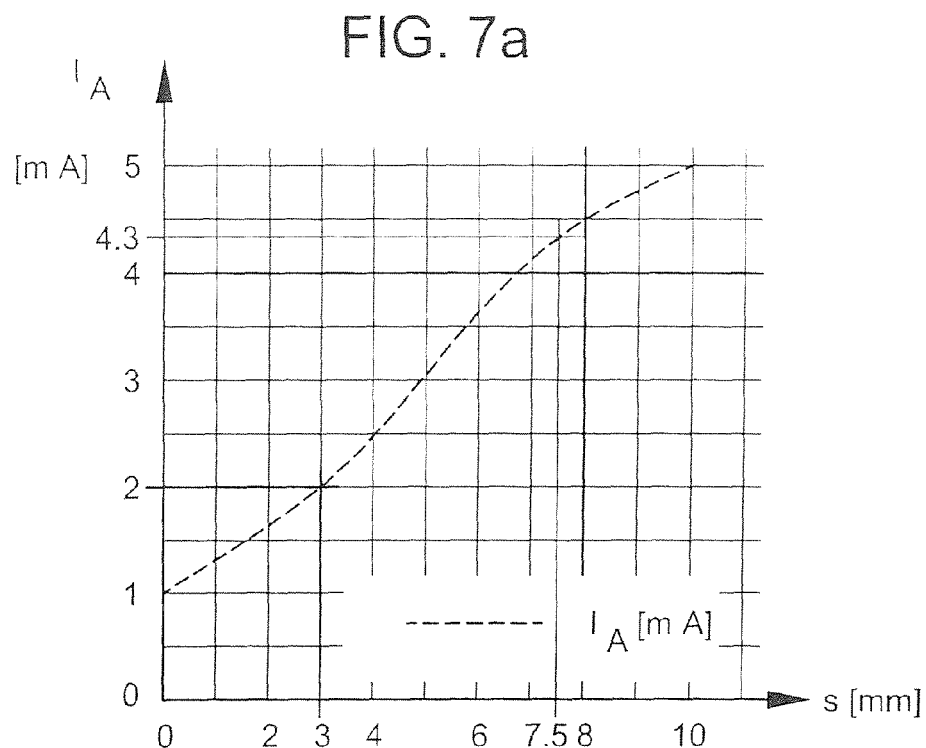
FIG. 7a
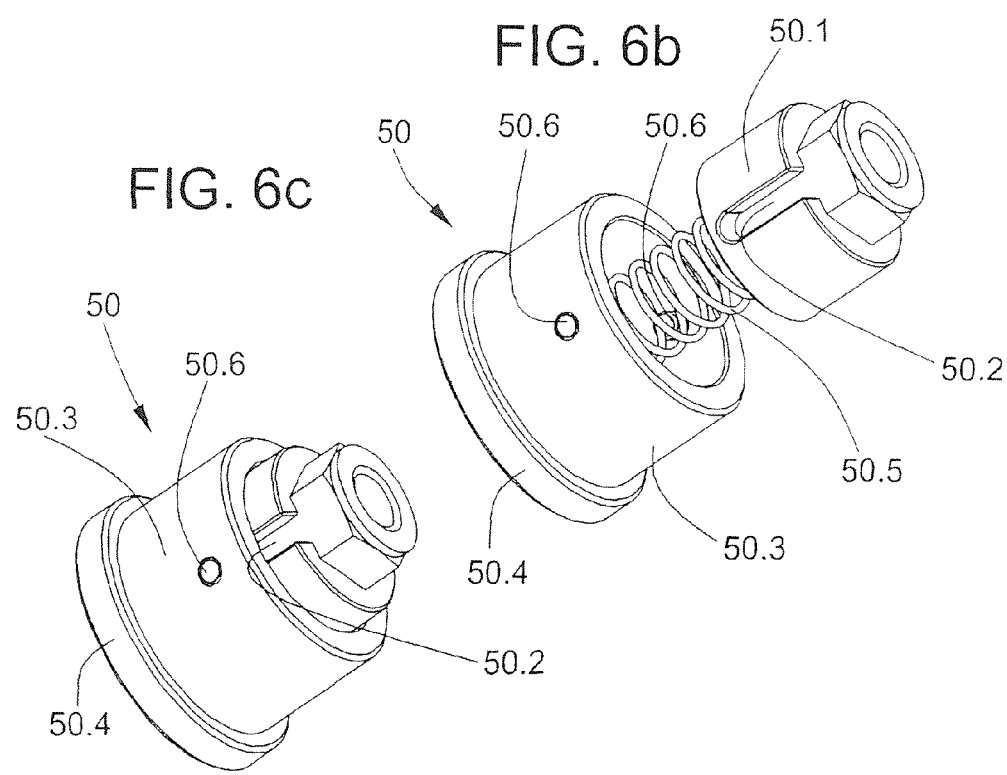
FIG. 6b
FIG. 6c

METHOD FOR MONITORING OPERATING STATES OF AN ELEVATOR UNIT BY SENSING MOVABLE BRAKE PART

The present application is a division of application Ser. No. 12/624,681, filed Nov. 24, 2009 now U.S. Pat. No. 7,909,145 which is a continuation of PCT/EP2008/055303 filed Apr. 30, 2008.

The invention relates to a device and a method for monitoring a brake device for an elevator drive consisting of brake levers with compression springs which exert on the latter a spring force, whereby brake linings cause a braking force on a brake drum and at least one brake magnet lifts the brake levers against the spring force.

BACKGROUND OF THE INVENTION

From patent specification EP 1 156 008 B1 a brake device for a drive machine has become known. The brake device consists of a first brake lever and a second brake lever, arranged on each of which is a brake shoe that acts on a brake drum. At their lower ends the brake levers are supported in swivel bearings on a bearing pedestal and at their upper ends guided on a bar. For the purpose of actuating the brake shoes, a compression spring is provided for each brake lever. For the purpose of lifting the brake shoes, provided on each brake lever is a magnet which acts against the compression spring. The magnets are arranged on a frame which is joined to the bearing pedestal. Arranged on the inside of each magnet support is a microswitch. A tappet of the microswitch is actuated by means of a cam that is arranged on a plunger disk. The switching status of the microswitch indicates to the control of the elevator whether by means of the magnets the brake is released or lifted, or whether the brake is not released or not lifted.

The present invention provides a device and a method for a safely acting brake device which prevents states that are dangerous for the users of the elevator.

The main advantages derived from the invention are that not only, as hitherto, is the end-position of the brake levers in the released state as brought about by the brake magnet monitored, but also the position of the movable brake-magnet part, such as the brake-magnet tappet, and of the plunger of the brake magnet. By this means it is possible to avoid the movable brake-magnet part such as, for example, the brake-magnet tappet or brake magnet plunger coming into contact with the fixed brake-magnet part such as, for example, the brake-magnet housing, through gradual abrasion of the brake linings and thereby reducing, or in the extreme case eliminating, the braking capacity of the brake device. The elevator drive can hence be directly switched off before the brake fails, or before a state that is dangerous for the users of the elevator can occur.

A further advantage is the simple construction of the device according to the invention, which can be realized by means of, for example, the use of a variety of sensors, such as a sensor proximity switch, linear emitter, etc.

With the invention, an elevator drive can be advantageously constructed and also an existing elevator drive advantageously retrofitted. The sensor can be arranged in the fixed brake-magnet part as, for example, inside or outside the brake magnet housing, in either case the relative movement of the movable brake part as, for example, the brake-magnet tappet or the plunger, relative to the fixed brake-magnet part as, for example, the brake-magnet housing, being registered.

With the simple construction of the position monitor, existing elevator systems can be retrofitted with the position monitor according to the invention without great outlay, for example by mounting the sensor on the brake-magnet tappet.

BRIEF DESCRIPTION OF THE INVENTION

In accordance with the foregoing purposes and advantages, an elevator drive according to the invention has a brake device with brake levers to which a spring force is applied by means of compression springs. Brake linings cause a braking force on a brake drum, and at least one brake magnet lifts the brake levers against the spring force. At least one sensor is provided that monitors a movement or a distance between a plunger of the brake magnet and a brake magnet housing. With the sensor signal, not only a signal for the end-position of the brake magnet tappet or brake magnet plunger can be generated, but also further signals as, for example, a signal for brake travel, a signal for brake lining wear, or a signal for brake drum heating. The safety for the elevator users can thereby be additionally increased, since the operating states of the brake device that lead to dangerous situations are promptly recognizable.

BRIEF DESCRIPTION OF THE DRAWINGS

The present invention is described in more detail by reference to the attached figures wherein FIG. 1 is a diagrammatic illustration of an elevator drive with a brake device with two compression springs and a brake magnet;

FIG. 2 is a diagrammatic illustration of an elevator drive with a brake device with a double brake magnet;

FIGS. 6b and 6c are perspective detail views of a spring-returning vane;

FIGS. 7 and 7a are graphs depicting an output signal of the sensor as it depends on the distance registered.

DETAILED DESCRIPTION OF THE INVENTION

Figures 1, 2:
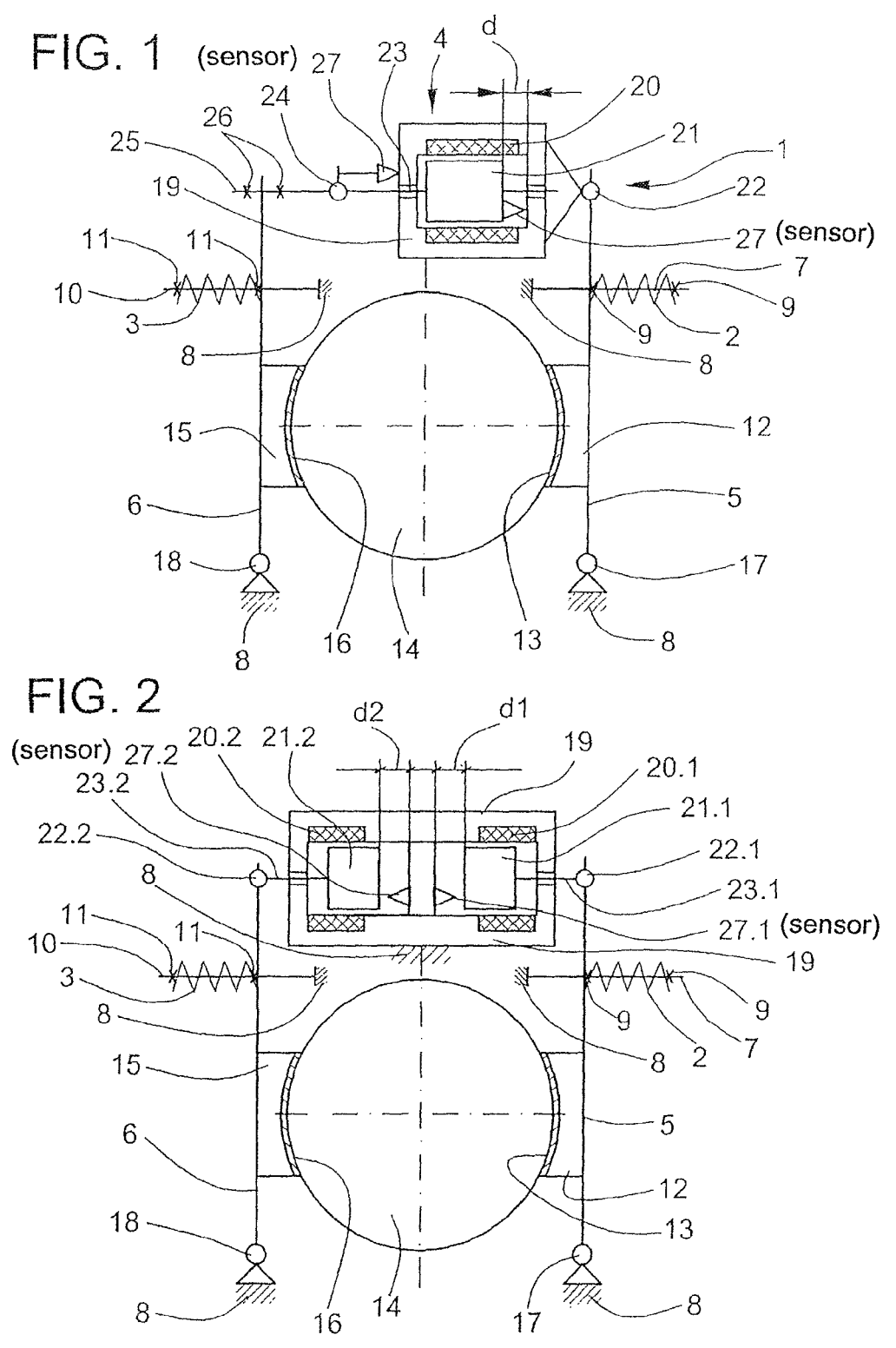
Figure 3:
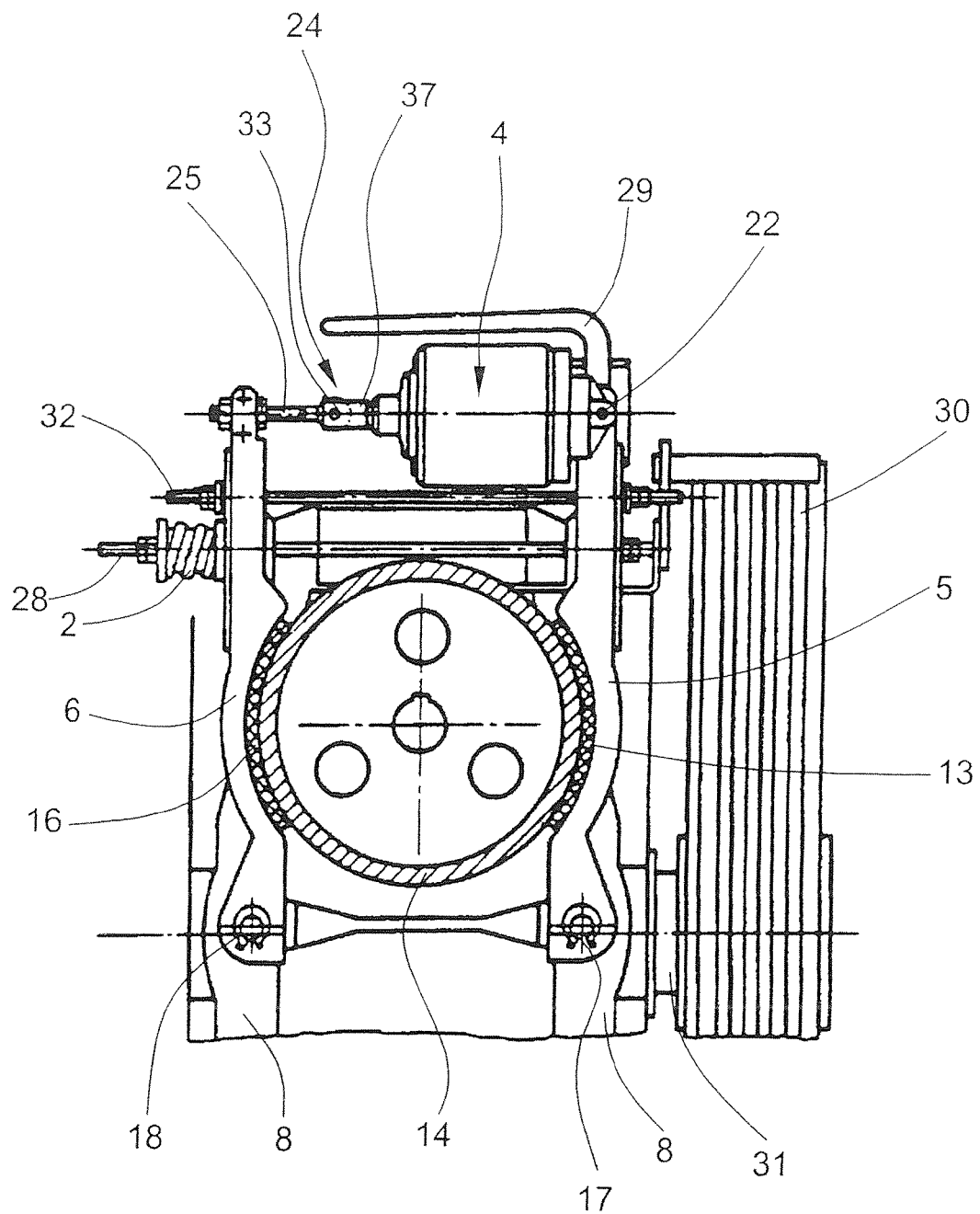
FIG. 3 is an illustration of variant embodiment of an elevator drive with a brake device with a compression spring and a brake magnet.

FIG. 1 shows diagrammatically a brake device 1 with a first compression spring 2, a second compression spring 3, a first brake lever 5, a second brake lever 6, and a brake magnet 4. The first compression spring 2 exerts a spring force on the first brake lever 5. The second compression spring 3 exerts a spring force on the second brake lever 6. The first compression spring 2 is guided by means of a first bar 7 which at one end is joined to a machine housing 8 and at the other end has a first adjusting element 9, for example nuts with locknuts mounted on threads of the bar 7, the braking force and the opening of the first brake lever 5 being settable with the adjusting element 9. This second compression spring 3 is guided by means of a second bar 10 which at one end is joined to the machine housing 8 and at the other end has a second adjusting element 11, for example nuts with locknuts mounted on threads of the bar 10, the braking force and the opening of the second brake lever 6 being settable with the adjusting element 11. Arranged on the first brake lever 5 is a first brake shoe 12 that carries a first brake lining 13, the first brake lining 13 creating a braking force on a brake drum 14. Arranged on the second brake lever 6 is a second brake shoe 15 that carries a second brake lining 16, the second brake lining 16 creating a braking force on the brake drum 14. The first brake lever 5 is mounted in swiveling manner on a first lever axle 17 that is supported on the machine housing 8. The second brake lever 6 is mounted in swiveling manner on a second lever axle 18 that is supported on the machine housing 8. The brake drum 14 is usually joined to a motor axle that is not shown.

The brake magnet 4 consists of a magnet coil 20 which is arranged in a fixed brake-magnet part as, for example, a brake-magnet housing 19 which, when carrying electric current, acts through its magnetic field on a movable brake-magnet part such as, for example, a plunger 21. The brake-magnet housing 19 with the magnet coil 20 and the plunger 21 repel each other and act against the spring forces of the compression springs 2, 3. The movable brake-magnet part executes a relative movement relative to the fixed brake-magnet part. At a first joint 22, the brake-magnet housing 19 is connected to the first brake lever 5. The plunger 21 is connected to a brake-magnet tappet 23 which in turn, at a second joint 24, is connected with a third bar 25. By means of third adjustment elements 26, the third bar 25 is connected to the second brake lever 6.

Figure 4:
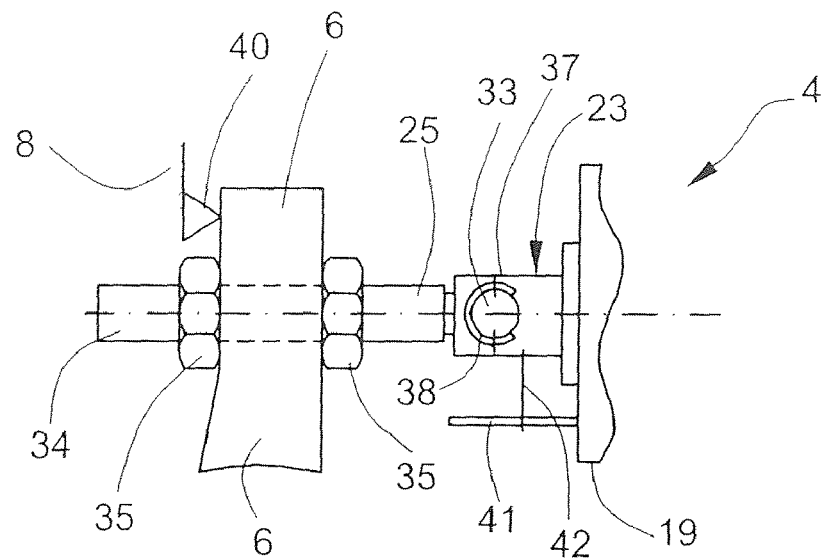
FIG. 4 is a detail illustration of a connection of a brake-magnet tappet with a brake lever.
Figure 5:
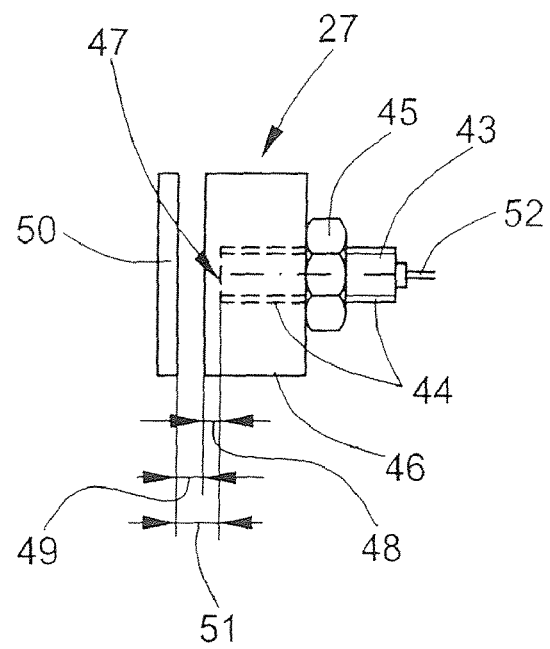
FIG. 5 is a diagrammatic illustration of a sensor for registering a movement or a distance.
Figure 6:
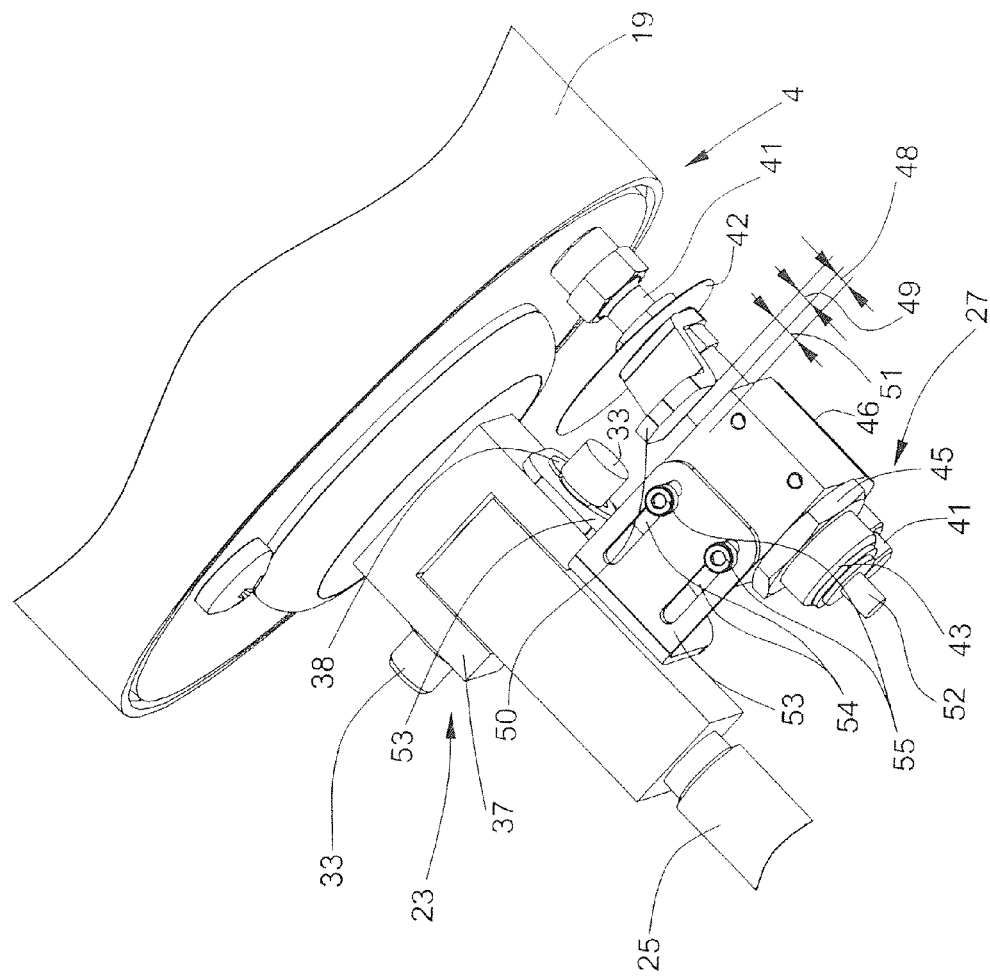
FIGS. 6 and 6a are perspective detail views of alternative arrangements of the sensor on the brake-magnet tappet.

The more the brake linings 13, 16 wear due to abrasion, the smaller the distance d of the plunger 21 from the brake-magnet housing 19 becomes. Should the plunger 21 rest against the brake magnet housing, the braking capacity of the brake linings 13, 16 is completely eliminated. So that this operating state that is dangerous for elevator users cannot occur, at least one sensor 27 is provided that detects the movement or the distance d. Sensor 27 can be, for example, a proximity switch, for example with analog output, or a linear emitter. The sensor 27 can be arranged on the plunger 21 and register the distance d from the brake-magnet housing 19. The sensor 27 can also be arranged on the brake-magnet housing 19 and register the distance d from the plunger 21. The sensor 27 can also be arranged on the brake-magnet tappet 23 and execute the relative movement of the brake-magnet tappet 23 relative to the brake-magnet housing 19, the sensor 27 registering the relative position of the brake-magnet tappet 23 relative to the brake-magnet housing 19. Details are explained more fully in FIGS. 4 to 6. The sensor arrangement according to FIGS. 4 to 6 is preferred for retrofitting in existing elevator installations. For new installations, a sensor arrangement according to FIGS. 4 to 6, or a brake magnet 4 with a built-in sensor 27, can be used.

FIG. 2 shows diagrammatically a brake device 1 with a double brake magnet 4 consisting of a first magnet coil 20.1, a second magnet coil 20.2, a first plunger 21.1, a second plunger 21.2, a first brake-magnet tappet 23.1, and a second brake-magnet tappet 23.2. The first brake-magnet tappet 23.1 is connected in swiveling manner (joint 22.1) to the first brake lever 5. The second brake-magnet tappet 23.2 is connected in swiveling manner (joint 22.2) to the second brake lever 6. The brake-magnet housing 19 is joined to the machine housing 8. A first sensor 27.1 monitors, or registers, the movement or the distance d1 between the first plunger 21.1 and the brake-magnet housing 19. A second sensor 27.2 monitors, or registers, the movement or the distance d2 between the second plunger 21.2 and the brake-magnet housing 19. The first sensor 27.1 can also be arranged on the swivel joint 22.1. The second sensor 27.2 can also be arranged on the swivel joint 22.2.

FIG. 3 shows a variant embodiment of a brake device 1 with only one compression spring 2 and one brake magnet 4. The compression spring 2 rests against the second brake lever 6 and against a fourth bar 28 which at its other end is connected to the first brake lever 5. The compression spring 3 thus exerts a spring force on both brake linings 13, 16. The brake magnet 4 functions as explained in FIG. 1, it being possible for at least one sensor 27 to be built into the brake magnet 4 or, as shown in FIGS. 4 to 6, mounted on the second swivel joint 24. The brake magnet 4 acts against the spring force of the compression spring 3 and releases the brake linings 13, 16 from the brake drum 14. The force of the brake magnet 4 can also be created manually by means of a brake-release lever 29. A fifth bar 32 limits the displacement of the brake levers 5, 6 by the magnet 4 or by the brake-release lever 29. Arranged on a gear output shaft 31, and referenced with 30, is a traction sheave over which suspension and traction means of the elevator car and of the counterweight are guided.

FIG. 4 shows details of the connection of the brake-magnet tappet 23 with the second brake lever 6. By means of a pin 33 that penetrates through the brake-magnet tappet 23, the third bar 25 is connected in swiveling manner to the brake-magnet tappet 23, spring rings 38 securing the pin at both ends. The end 37 of the brake-magnet tappet 23 may be fork-shaped. Provided at the free end of the third bar 25 is a thread 34 which, together with nuts 35, serves as third adjusting element 26. At least one brake lever switch 40 can be provided to monitor whether the brake levers 5, 6, and thus the brake linings 13, 16, have been released from the brake drum 14.

As shown in FIG. 4, the brake-lever switch 40 can monitor the position of the brake lever 6, or be arranged in such manner that the former monitors the position of the pin 33 relative to the brake-magnet housing 19. Normally arranged on the brake-magnet housing 19 is a sixth bar 41, provided on which is a first vane 42. With the relative position of the pin 33 relative to the first vane 42, the distance of the plunger 21 from the brake-magnet housing 19 can be determined. The sixth bar 41 together with the first vane 42 is also referred to as a "mechanical indicator". The more the brake linings 13, 16 wear through abrasion, the less the pin 33 is distant from the first vane 42. As shown in FIG. 6, in the present exemplary embodiment the sixth bar 41 and the pin 33 are used as a mechanical reference point for the sensor 27.

FIG. 5 shows diagramatically the sensor 27 for registering the movement or the distance d of the plunger 21 from the brake-magnet housing 19, or the relative movement of the brake-magnet tappet 23 relative to the brake-magnet housing 19. In the present exemplary embodiment, provided as sensor 27 is an inductive proximity switch with an analog output which responds to ferromagnetic objects. The sensor 27 has a sensor housing 43 with a second thread 44 onto which a locking nut 45 can be screwed. The sensor housing 43 is screwed into a magnetically neutral distance piece 46 of, for example, plastic, and by means of the locking nut 45 secured against turning, the distance piece 46 on the end-face 47 of the sensor 27 having a defined wall thickness 48, for example 1 mm. Referenced with 49 is an air gap between a second vane 50 and the distance piece 46. Wall thickness 48 plus air gap 49 yields the sensor gap 51 from the second vane 50. In FIG. 7 and in FIG. 7a the sensor gap 51 is referenced as "s." With the distance piece 46, setting work on site is avoided. As shown in FIG. 6 and in FIG. 6a, the distance piece 46 serves also as a support for the sensor 27. The sensor 27 can at the factory be completely screwed into the distance piece 46 and installed on site without settings in the axial direction. Power supply to the sensor 27, and the signal output of the sensor 27, take place via a connecting cable 52.

Figure 6A:
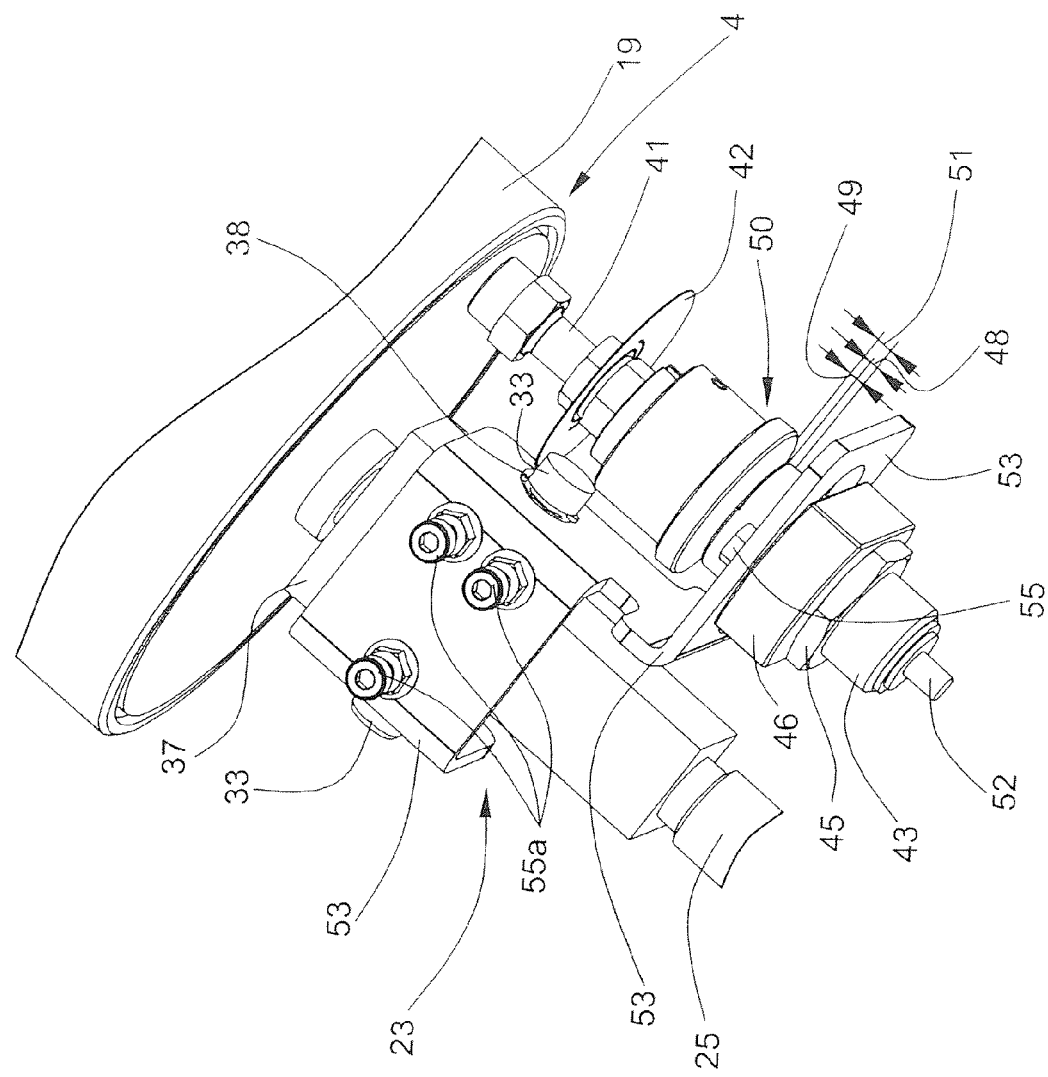
Figure 7:
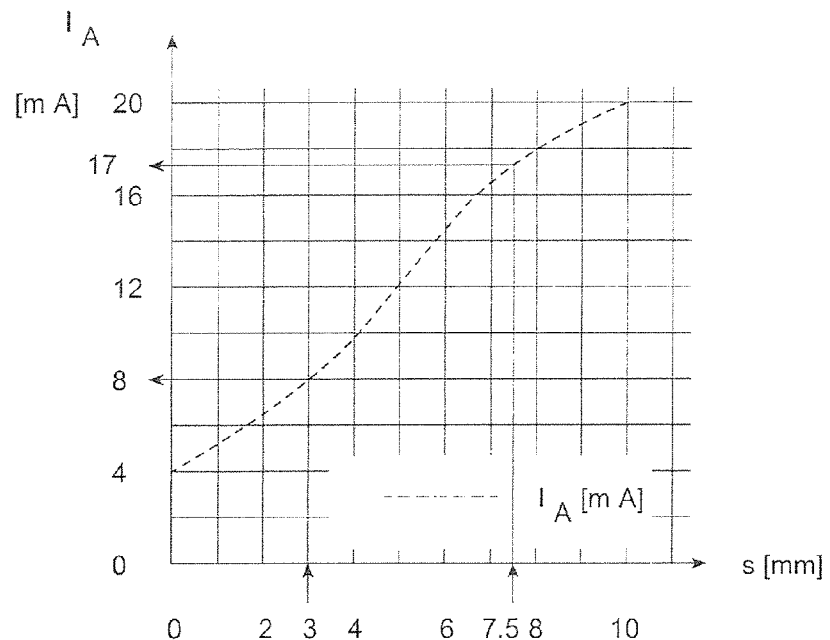

FIG. 6, FIG. 6a show details of arrangements of the sensor 27 on the brake-magnet tappet 23. A stirrup 53 is fastened onto one end of the existing pin 33, and arranged on the other end is the distance piece 46 that bears the sensor housing 43. In FIG. 6, with the aid of elongated slots 54 and screws 55, the distance piece 46 can be aligned perpendicular to the direction of movement of the brake-magnet tappet 23 on the existing sixth bar 41. The second vane 50 is fastened to the sixth bar 41. A setting of the brake-magnet tappet 23 in the direction of movement is not necessary.

In FIG. 6a, the stirrup 53 is fastened by means of screws 55a to the fork-shaped end 37 of the brake-magnet tappet 23. As shown in FIG. 6a, the second vane 50 is arranged coaxial to the axis of the sixth bar 41 and of the sensor 27. The second vane 50 is embodied in a spring-returning manner.

By this means it is possible to avoid the suffering of damages by sensor 27 and/or the vane 50 should a collision occur between the sensor 27 and the second vane 50, either because of incorrect mechanical settings or because of a travel of the brake magnet 4 that deviates from the norm.

FIGS. 6b and 6c show details of the second vane 50. A cylindrical base body 50.1 is connected with the sixth bar 41 and serves as a support for guides 50.2 which slide along pins 50.6 of a cap 50.3 with disk 50.4. A spring 50.5 rests at one end on the base body 50.1 and at the other end on the disk 50.4 and holds the cap 50.3 with the disk 50.4 in the end-position shown in FIGS. 6a and 6c. In the case of a collision of the sensor 27 with the vane 50, the cap 50.3 with the disk 50.4 is moved against the spring force of the compression spring 50.5.

FIG. 7, FIG. 7a show the output signal of the sensor 27 as it depends on the registered distance, sensor gap 51, or relative movement of the brake magnet tappet 33 relative to the brake-magnet housing 19. The varying distance of the endface 47 of the sensor 27 from the second vane 50 is referenced in FIG. 7, FIG. 7a as "s." The proximity switch with analog output that is used as sensor 27 may have a current output between 0 and 20 mA, which is robust against electromagnetic interference signals as shown in FIG. 7, or a current output signal between 0 and 5 mA as shown in FIG. 7a at a sensor gap 51, or s, of between 0 and 10 mm. FIG. 7, FIG. 7a show the characteristic of the current I as a function of the travel s or of the sensor gap 51. Of interest is the linear area of the curve between 8 mA and 17 mA as shown in FIG. 7, or between 2 mA and 4.3 mA as shown in FIG. 7a, and a sensor gap 51, or s, between 3 mm and 7.5 mm. The analog current output signal is fed to an analog/digital converter 64 of a monitor 60 that is shown in FIG. 8 and by which it is evaluated.

On elevators with many short trips and/or that stop at many floors, the brake linings 13, 16 can wear more quickly than usual. Elevators that are halted by the brake in the area of the story (so-called two-speed elevators), have higher wear of the brake linings. A defective state of the brake can be promptly deduced from the diminishing leveling accuracy of the elevator car on the story. With drives with releveling, the leveling accuracy is always the same, and a defective state of the brake does not manifest itself visibly.

A further cause of excessive wear of the brake linings 13, 14 can be an at least partial failure of the magnet coil 20, as a consequence of which the magnet coil 20 no longer produces the full force for releasing the brake lever 5, 6, and the motor moves the traction sheave 30 with closed brake levers 5, 6. As shown in FIG. 4, to avoid this state with the resultant excessive wear of the brake linings 13, 16, a brake-lever switch 40 is provided which monitors the position of the brake levers 5, 6 when the brake is perceived by the elevator control to be lifted, and determines whether on a travel command the brake levers 5, 6, and thus the brake linings 13, 16, have been released from the brake drum 14. Should the brake-lever switch 40 not be present, or not supported by the elevator control, travel without lifted brake cannot be avoided, but the monitor 60 nonetheless detects and prevents a total failure of the brake.

Figure 8:
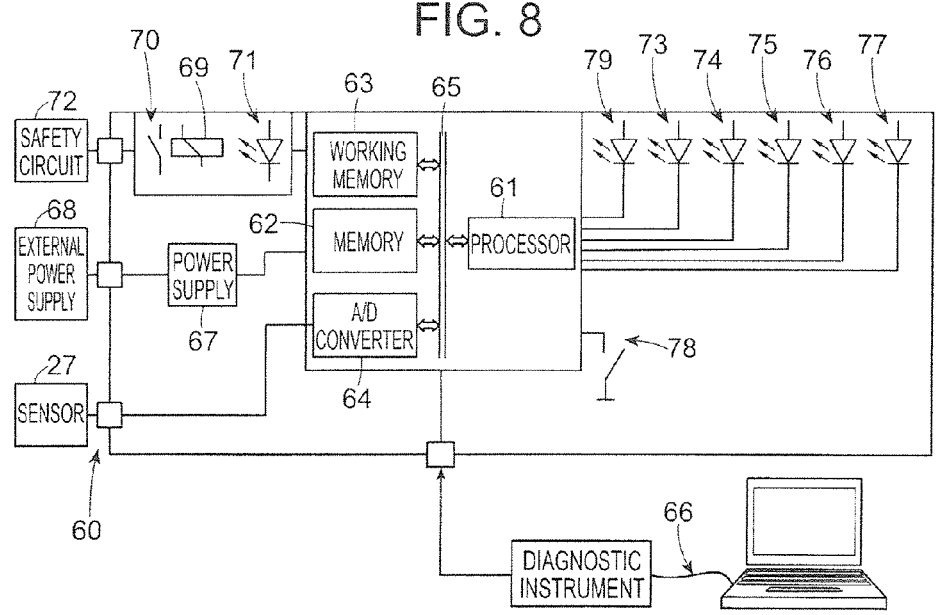
FIG. 8 is a block circuit diagram of a monitor for evaluating the sensor signal and for indicating the state of the brake device.

FIG. 8 shows a block circuit diagram of the monitor 60 for analyzing the sensor signal of the sensor 27 and for indicating the state of the brake device 1. A processor 61 of the monitor 60 operates according to a program that is stored in a program memory 62, the processor placing data into a working memory 63 or fetching it from thence. The analog sensor signal of the sensor 27 is fed to the analog/digital converter 64 of the monitor 60. Converter 64, memory 63, memory 62, and the processor 61 communicate via a bus system 65. By means of a diagnosis instrument 66, the program or parameters can be modified or data read out. A first power-supply device 67 supplies the monitor 60 with electrical energy, for example with a voltage of 5 V. The first power-supply device 67 is supplied by a monitor-external second power-supply device 68, for example with alternating voltage from the power supply network at 220 V or, for example, with direct voltage at 24 V from the not-shown elevator control.

Depending on the sensor signal of the sensor 27, a relay 69 is triggered. In the normal operating state of the brake device 1, the relay 69 is activated and a potential-free contact 70 that belongs to the relay 69 is closed. To visualize the state of the closed contact, a first indicator 71, for example a green-lit LED, can be provided. In the safety circuit 72 of the not-shown elevator control, the potential-free contact 70 is connected in series. A second potential-free contact can also be connected in series, and on failure of the relay 69 the safety circuit can be opened by means of the second potential-free relay-operable contact. The safety circuit of the elevator control is a series circuit of contacts that monitor important functions of the elevator operation as, for example, doors closed, brake lifted, normal speed of the elevator car, normal load, etc., and if at least one contact is open no car travel is executed.

Depending on the sensor signal of the sensor 27, different operating states are detected and indicated. The normal operating state is made visible by means of a second indicator 73, for example by means of a green-lit LED. The operating state corresponding to excessively worn brake linings 13, 16 is made visible by means of a third indicator 74, for example by means of a red-lit LED. A further operating state that corresponds to the stroke of the brake device 1 or of the brake-magnet tappet 23 is visualized by means of a fourth indicator 75, for example by means of a red-lit LED. A further operating state corresponding to heating of the brake drum 14 is visualized by means of a fifth indicator 76, for example by means of a red-lit LED. A further operating state corresponding to a failure detected by electronic tests is visualized by means of a sixth display 77, for example by means of a red-lit LED. A further operating state of the brake corresponding to the closed position, or to the open position, of the brake levers 5, 6 is visualized by means of a seventh indicator 79, for example by means of an orange-lit LED. The monitor 60 can be equipped with all, or with a selection of, the said indicators.

With a push-button 78, on electronic initialization of the monitor 60, measurement values of the sensor 27 that were saved in the non-volatile working memory 63 (EEPROM) can be reset. After mechanical setting work on the brake device 1, the push-button 78 must be pressed. For example, the processor 61 calculates the mean value of a plurality of measurement values of the sensor signal for the closed position of the brake levers 5, 6, or for the brake that has been activated by means of compression springs 2, 3, and the mean value of a plurality of measurement values of the sensor signal for the open position of the brake levers 5, 6, or of the brake levers 5, 6 that have been lifted by means of the brake magnet 4. After resetting of the mean values, mean values of new measurement values are calculated and saved.

The sixth bar 41 with the first vane 42 and the tappet pin 33 are used as mechanical reference point for the sensor 27, there being provided as sensor gap 51, for example, 3 mm, or as air gap 49, 2 mm. As shown in FIG. 7, at 3 mm sensor gap 51 the linear area of the sensor signal, or of the output current I, begins. With an air gap 49 of 2 mm, collision of the sensor 27 with the second vane 50 can normally also be avoided at maximum wear of the brake linings 13, 16.

In normal operation with closed position of the brake levers 5, 6 and with open position of the brake levers 5, 6, the sensor gap 51 in the present exemplary embodiment is greater than 3 mm. In the closed position of the brake levers 5, 6, the sensor gap 51 is given. Deviations are caused by wear of the brake linings 13, 16 or by heating of the brake drum 14. The monitor 60 can differentiate between the deviations. As the brake linings 13, 14 wear, the brake-magnet tappet 23 moves relative to the brake-magnet housing 19. On heating of the brake drum 14, the brake magnet tappet 23 moves relatively away from the brake-magnet housing 19.

Based on the analog/digital transformed sensor signal, the processor 61 of the monitor 60 calculates the speed and the direction of the brake magnet tappet 23. To determine the closed position and the open position of the brake levers 5, 6, signal values or measurement values are allocated to the corresponding position if the brake-magnet tappet 23 does not, for example, move more than 0.01 mm in 100 ms. For the closed position, a sensor gap 51 of, for example, between 3 m and 5.5 mm is possible, and for the open position, for example, a sensor gap 51 of between 5 mm and 7.5 mm is possible.

With each car travel the speed and the direction of the brake-magnet tappet 23 changes, whereby the number of trips is detected and saved in the working memory 63. During the first, for example, 8 trips, the indicator 73 flashes at, for example, 10 Hz, with, for example, 8 signal values of the sensor 27, or measurement values, being assigned to the corresponding closed position or open position and therefrom the corresponding mean values formed and saved in the working memory 63. The closed position and open position learned on the brake device 1 serve as a starting point for the operating state of excessive wear of the brake linings 13, 16 or for the operating state of excessive heating of the brake drum 14. Thereafter, the second indicator 73 flashes at, for example, 1 Hz and indicates a fully functional capability of the brake device 1. Monitoring of the closed position and of the open position can be continued. Should the mean values of the measured signal values deviate by more than, for example, 0.5 mm, the saved mean values are overwritten with the current mean values. Alternatively, the aforementioned closed position and open position can be learned once only with a plurality of measurement values.

With increasing wear of the brake linings 13, 16, for example 0.5 mm before the critical point, the third indicator 74, is switched on and switched off with, for example, a frequency of 10 Hz. On attaining the critical point (sensor gap 51=3 mm), the relay 69 is switched off with a time delay and the potential-free contact 70 is opened. The time delay is of such magnitude that the elevator car can complete the current trip and the transported persons can leave the elevator car. The operating state of excessive wear of the brake linings 13, 16 is then signaled with the continuously switched-on third indicator 74.

Should the stroke or distance between the closed position and the open position be smaller than, for example, 2 mm during, for example, 3 seconds, the monitor 60 assumes a fault, for example an incorrect mechanical setting or a mechanical blocking. A further fault that can be detected from the stroke is the number of open positions in relation to the maximum travel time of the elevator car. On occurrence of a stroke fault, the relay 69 is switched off with a time delay and the potential-free contact 70 is opened. The time delay is of such magnitude that the elevator car can complete the current trip and the transported persons can leave the elevator car. The fourth indicator 75 is initially, for example, switched on and switched off with a frequency of 10 Hz and then continuously switched on.

If, due to failure of the brake magnet, or due to software faults, or due to hardware faults in the electronic switching circuits, the brake device 1 is not lifted, or if the brake linings 13, 16 are not released from the brake drum 14, the monitor 60 can also not detect a stroke fault. In the case of car travel with a closed brake, the brake drum 14 and the brake linings 13, 16 heat. Upon heating, brake drum 14 and brake linings 13, 16 expand and cause a movement of the brake-magnet tappet 23 relative to the brake-magnet housing 19 opposite in direction to the movement caused by wear. The deviation is evaluated in relation to the distance of the closed position from the critical point. The more advanced the wear of the brake linings 13, 16 is, or the thinner the brake linings 13, 14 are, the smaller is the deviation that causes switching-off. The deviation can lie in the range of, for example, 0.7 mm to 1.5 mm. On occurrence of an impermissible deviation, the relay 69 is switched off with time delay and the potential-free contact 70 is opened. The time delay is of such magnitude that the elevator car can complete the current trip and the transported persons can leave the elevator car. The fifth indicator 76 is initially switched on and off with a frequency of 10 Hz and then switched on continuously.

The monitor 60 itself can also prevent switching-on of the relay 69 or effect switching-off of the relay 69 and an opening of the potential-free contact 70. Reasons therefor are negative plausibility tests during electronic initiation or operation of the monitor 60. Further reasons for switching-off are a missing sensor 27, or a brake device 1 which has not been lifted for a long period of time, for example three months. This type of fault is visualized by means of the sixth indicator 77.

The invention claimed is:

1. A method for the detection and indication of different operating states of an elevator car drive with a brake device, comprising the steps of:
    mounting at least one sensor on a brake-magnet tappet of a movable brake-magnet part;
    generating a sensor output proportional to an extent of relative movement of the brake-magnet tappet relative to a fixed brake magnet part; and
    monitoring the sensor output.

2. A method for the detection and indication of different operating states of an elevator car drive with a brake device comprising:
    providing a sensor generating an output proportional to an extent of a relative movement of a brake magnet; and
    providing a visual indication, based upon the sensor output, of at least one of a normal operating state, visualized by means of a second indicator;
    an operating state corresponding to excessively worn brake linings, visualized by means of a third indicator;

an operating state corresponding to a stroke of the brake magnet, visualized by means of a fourth indicator;

an operating state corresponding to a heating of a brake drum, visualized by means of a fifth indicator; and an operating state corresponding to a failure detected by electronic tests of a monitor, visualized by means of a sixth indicator.

3. The method according to claim 2, wherein a plurality of signal values of the sensor are assigned to a corresponding plurality of closed and open positions of the brake device; mean values are determined from the signal values; and a closed position and an open position corresponding to the mean values are used as starting points for the determination of at least one of an operating state corresponding to excessive wear of brake linings or for an operating state corresponding to excessive heating of a brake drum.

4. The method according to claim 2, wherein the stroke is either characterized as a distance between a closed position and an open position of the brake device, and on falling below a predetermined value is recognized as faulty, or as a total of the number of open positions for the brake device beyond a set value in relation to a maximum travel time of the elevator car.

5. The method according to claim 3, wherein movement of a brake magnet tappet of a movable brake-magnet part relative to a fixed brake-magnet part and contrary to movement caused by wear that is caused by expansion that takes place on excessive heating of the brake drum and brake lining is evaluated in consideration of a distance of the closed position from a critical point, wherein a correspondingly smaller tappet movement results in a change of state indication as the state of wear of the brake lining increases.

6. The method according to claim 2, wherein an operating state that corresponds to at least one of excessively worn brake linings, the stroke of the brake magnet, the heating of a brake drum, or the failure detected by electronic tests of a monitor, results in a switching-off of the elevator drive or the elevator.

7. The method according to claim 6, wherein the switching-off is time-delayed, the time delay being sufficient to allow the elevator car to complete a current trip and transported persons to leave the elevator car before the switching-off occurs.

* * * * *